D. N. Green,
Scoop,
Nº 66,322. Patented July 2, 1867.
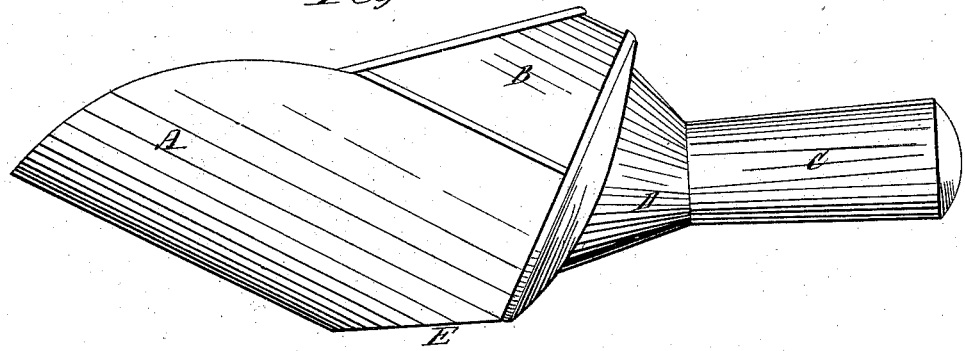
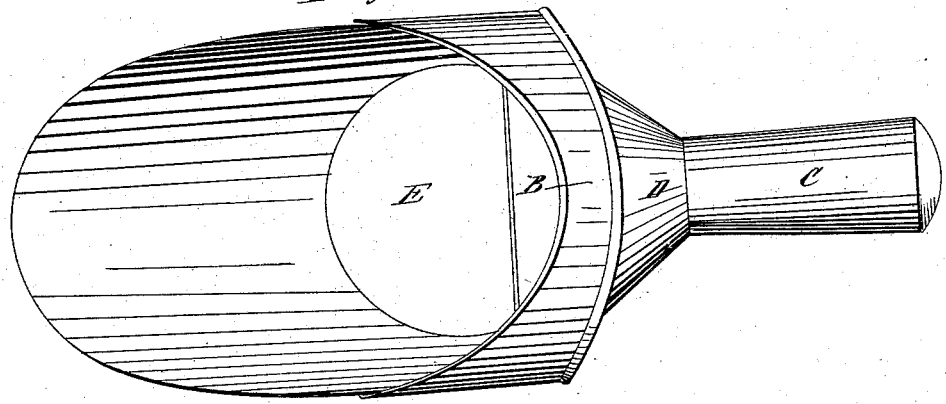
Witnesses
W. J. Hetchenn
B. D. Ceenkling
Inventor
David N. Green
by Attorneys
J. B. Woodruff & Son

United States Patent Office.

DAVID N. GREEN, OF COLD WATER, MICHIGAN.

Letters Patent No. 66,322, dated July 2, 1867.

---

IMPROVED HAND-SCOOP.

---

The Schedule referred to in these Letters Patent and making part of the same.

---

TO ALL WHOM IT MAY CONCERN:

Be it known that I, DAVID N. GREEN, of the city of Cold Water, in the county of Branch, in the State of Michigan, have invented certain new and useful improvements in Hand-Scoops for the use of grocers, millers, grain, flour, feed, and seed stores, and other purposes; and the following is a full, clear, and exact description of the same, reference being had to the accompanying drawing, making a part of this specification, in which—

Figure 1 represents a side view of my improved hand-scoop.

Figure 2 shows a top and inside view of the same.

The object of my invention is to make and supply the market and trade with the most approved form of hand-scoops that will not easily upset with their contents when laid down upon a counter or flat surface, so that grocers can show to their customers samples of their teas, coffee, sugar, etc., and enable them to compare the quality while the grocer can be otherwise employed. Flour, feed, and seed dealers can also exhibit their goods in samples. The hand-scoop as I construct it is a most convenient toll dish for millers, and may be made of the standard sizes, and used for measures for all kinds of produce and market vegetables.

My invention consists in making a base or flat bottom under the centre of gravity on a circular or oval scoop, so that it will not upset with its contents when placed upon a counter or flat surface, whether there be much or little in it.

That others may be enabled to make my improved universal scoop, I will describe it more fully, referring to the drawings and to the letters of reference marked thereon.

I make my improved scoops of any desired size for the purposes required. They may be formed out of any suitable sheet metal, such as galvanized iron, Russia sheet iron, brass, copper, zinc, or tin. They may be made from patterns so perfected as to be accurate measures of pints, quarts, gallons, pecks, and bushels, so as to be the most convenient measures used for handling vegetables, grain, fruits, etc., etc. The mouth of the scoop A, and the cap B, handle C, and the brace D are constructed in the ordinary manner, the joints folded together and locked or soldered in the usual way. Directly under the centre of gravity I make a flat place, E, of such dimensions as will give the scoop a firm and substantial base to rest upon, and will find its bearing on the base or flat place E when laid upon the counter or placed upon any horizontal flat surface.

Thus it will readily be seen that my improvement in hand-scoops, although in itself so very simple that its patentability might to some seem to be questionable, yet has utility no one that ever had occasion to use a scoop will doubt, it having been tested with the most perfect satisfation on both a large and a small scale by produce, grain, seed dealers, grocers, and druggists for several weeks, who without an exception declare that the improvement in a scoop is indispensable.

Having thus fully described my invention, what I claim as new and useful, and desire to secure by Letters Patent, is—

A cylindrical hand-scoop with a flat base to prevent the same from turning over, as and for the purposes specified.

In testimony whereof I hereunto set my hand on this 3d day of April, 1867.

DAVID N. GREEN.

Witnesses:
JUSTIN LAWYER,
JOHN CHANDLER.